US008738176B1

(12) United States Patent  
Meinke

(10) Patent No.: US 8,738,176 B1
(45) Date of Patent: May 27, 2014

(54) DETERMINATION OF LOG STABILITY

(71) Applicant: U. S. Natural Resources, Inc., Woodland, WA (US)

(72) Inventor: Stephan Meinke, Parksville (CA)

(73) Assignee: U.S. Natural Resources, Inc., Woodland, WA (US)

( * ) Notice: Subject to any disclaimer, the term of this patent is extended or adjusted under 35 U.S.C. 154(b) by 0 days.

(21) Appl. No.: 13/926,954

(22) Filed: Jun. 25, 2013

Related U.S. Application Data

(63) Continuation of application No. 13/834,572, filed on Mar. 15, 2013.

(60) Provisional application No. 61/758,714, filed on Jan. 30, 2013.

(51) Int. Cl.
*G06F 7/00* (2006.01)

(52) U.S. Cl.
USPC ............ 700/229; 700/213; 700/228; 700/230

(58) Field of Classification Search
None
See application file for complete search history.

(56) References Cited

U.S. PATENT DOCUMENTS 5,685,410 A * 11/1997 Ritola et al. ............. 198/457.06
2008/0230151 A1 * 9/2008 Appeldoorn et al. ......... 144/382

* cited by examiner

*Primary Examiner* — Yolanda Cumbess
(74) *Attorney, Agent, or Firm* — Schwabe, Williamson & Wyatt

(57) ABSTRACT

Embodiments of techniques and systems for log stability determination are described. A log position optimizer may be configured to identify one or more rest positions for a log to be conveyed on a sharp chain. The rest positions may be identified based on identification of contact points where the sharp chain may contact the log that have no intervening contact points that prevent stable contact between the log and the sharp chain. A preferred rest position may be selected out of the identified rest positions. The preferred rest position may be selected based on determination of which contact points are stable or unstable. This determination may be made for each contact point in a cross-sectional plane of the log. The log position optimizer may then control a log positioning mechanism to position the log in the selected rest position. Other embodiments are also described and claimed.

26 Claims, 15 Drawing Sheets

DETERMINATION OF LOG STABILITY

CROSS-REFERENCE TO RELATED APPLICATIONS

This application is a continuation of U.S. patent application Ser. No. 13/834,572, filed Mar. 15, 2013, which claims the benefit of U.S. Provisional Application No. 61/758,714, filed Jan. 30, 2013, the entire disclosures of which are incorporated by reference herein.

BACKGROUND

A workpiece, such as a log or a cant, is typically transported on a sharp chain conveyor system. Such a sharp chain conveyor system may include a conveyor chain having sharp teeth which extend vertically upwards from the conveyor chain to firmly engage and secure onto the surface of the log. In many systems, a scanner and optimizer may be used to determine a preferred position of the log on the sharp chain conveyor for subsequent cutting. The scanner and optimizer may also control a rotating conveyor, or a log turner may rotate the log into such a preferred position. Once the log is positioned, it may be fed onto the sharp chain conveyor, to be transported to breakdown sawing machines.

Although such systems may be capable of positioning the log in a preferred position, the log may be subsequently displaced from the preferred position as the log is subsequently transported. In particular, this may be true of logs that are not perfectly straight or of a constant cross section. Such irregular logs may engage the teeth of the sharp chain at different angles and at different depths at different points along their length. The differences in contact may cause torquing forces to be experienced by the log as it travels. These forces may then cause the log to pivot relative to the sharp chain and put the log in a new, possibly less-desired position prior to cutting.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques and systems for determination of log stability are described herein. In embodiments, a log position optimizer is configured to identify one or more rest positions for a log to be conveyed on a sharp chain. In various embodiments, the rest positions may be identified based on identification of contact points where the sharp chain may contact the log with no intervening contact points that prevent stable contact between the log and the sharp chain. In various embodiments, a preferred rest position may be selected out of the identified rest positions. In various embodiments, the preferred rest position may be selected based on determination of which contact points are stable and which are unstable. This determination may be made for each contact point in a cross-sectional plane of the log. The log position optimizer may then control a log positioning mechanism to position the log in the selected rest position. In various embodiments, by positioning the log in a more stable orientation and/or position, the log may be less likely to fall off the sharp chain or to reposition itself on the sharp chain. Other embodiments are also described.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
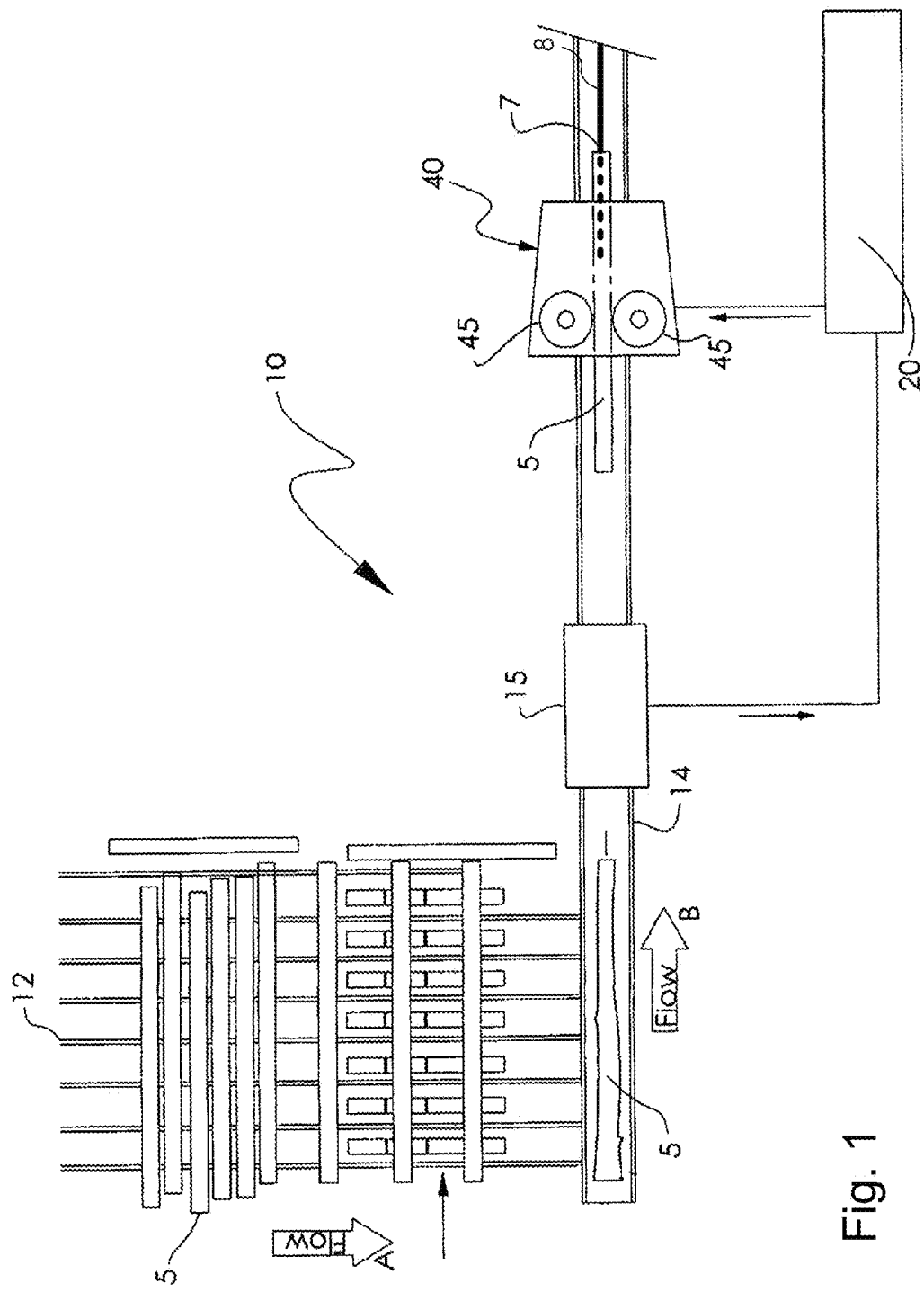
FIG. 1 is a view of an infeed, scanner, log position optimizer, conveyor, and turning mechanism portions of a log stability determination and positioning system, in accordance with various embodiments.

Referring now to FIG. 1, embodiments of a log stability determination and positioning system 10 ("system 10") are illustrated. In various embodiments, the system 10 may include one or more of: a conveyer 14, a scanner 15, a log position optimizer 20 ("LPO 20"), and a turning mechanism 40. As seen in FIG. 1, a plurality of logs 5, located on an infeed 12 may be transported by suitable means, such as a chainway or other conveyor, in downstream direction of flow A on a feedpath towards a conveyor 14.

Logs 5 may then be transported on conveyor 14 in a downstream direction B toward and through scanner 15 entering at a front end 7. Scanner 15 may detect geometrical information and/or surface characteristics or features of each log 5. Based on this scanned information, the LPO 20 may determine one or more preferred positions and/or orientations for each log 5 such that the log 5 may be rotated into a position prior to processing in a downstream machine center such as a canter, gangsaw, etc. In various embodiments, the LPO 20 may be configured to identify one or more positions and/or orientations for each log 5 based on one or more determinations of stability for log positions. In various embodiments, the LPO 20 may also be configured to select a position and/or orientation; this selection may be based in part on one or more determinations of log stability, as well as other factors, such as predictions of board production or waste, particular shape needs, etc. In various embodiments, while the LPO 20 is referred to herein as a log position "optimizer," it may be understood that this does not place any particular limitation or requirement on any results or determination made by the LPO 20. Instead, log positions and/or orientations may be determined and/or selected based on one or more metrics that allow positions and/or orientations to be compared without requiring any particular orientation to be determined to be "optimal."

In various embodiments, the LPO 20 may be configured to control a log positioning mechanism 40 to rotate and position a log 5 into a position and/or orientation selected by the LPO 20. In various embodiments, the log positioning mechanism 40 may include a plurality of turning rolls 45 located on each side of conveyor 14 that may be spiked to enable turning rolls 45 to engage the surface of a log 5 to rotate and/or position the log 5. As seen in FIG. 1, while only two pairs of turning rolls 45 are illustrated, this illustration is not intended to be limiting as two turning rolls 45, one on each side of conveyor 14, or four or more even numbered pairs of turning rolls 45 may be employed. In various embodiments, the log positioning mechanism may be used to rotate and/or position the log 5 before the log is placed on a sharp chain 8 for further transport. In various embodiments, the log positioning mechanism 40 may include or substitute other devices as part of a collective positioning mechanism. For example, the system 10 may include additional rolls, skids, or other devices downstream that may be used to skew and/or slew the log 5 after rotation and before the log is attached to the sharp chain 8. In other embodiments, log positioning mechanism 40 may be or include any type of log turner. Examples of log turners include, but are not limited to, knuckle type turners, feedroll turners, dual roll turners, quad roll turners, flying turners, and ring type turners. In some embodiments, the algorithms used may be independent of the turning mechanism.

FIGS. 2A-C and 3A-C are schematic diagrams illustrating examples of stability configurations for logs, in accordance with various embodiments. As discussed above, in various embodiments, the LPO 20 may be configured to consider various potential positions and/or orientations for a log, and from these, identify one or more rest positions for the log. In various embodiments, the identification of these rest positions may be based, at least in part, on stability of various positions for the log. As illustrated in the examples of FIGS. 2A-C and 3A-C, these stability determinations may be performed through analysis of one or more cross-sectional planes of the log.

Figure 2:
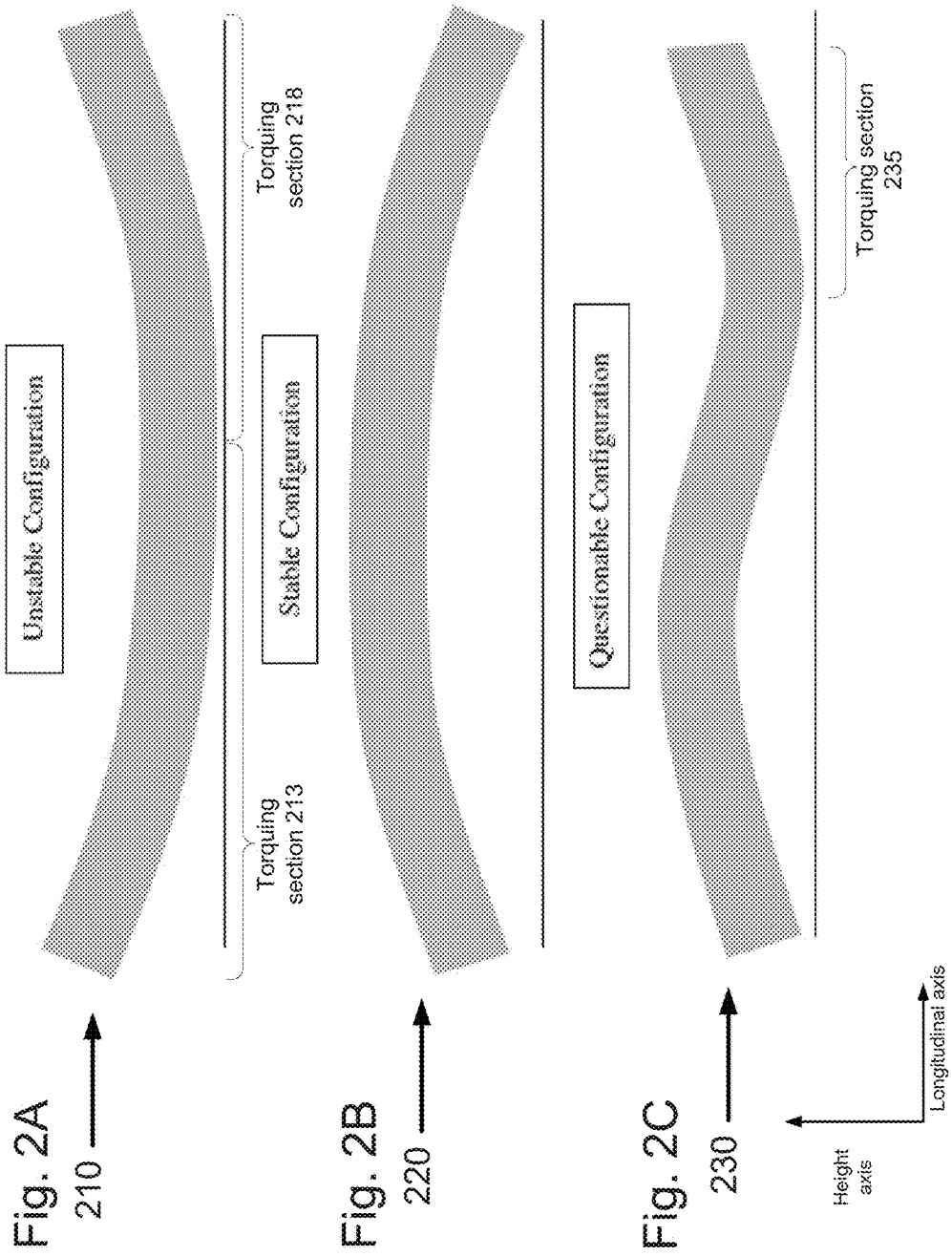
FIGS. 2A, 2B, and 2C are diagrams illustrating examples of stability configurations for logs in a first plane, in accordance with various embodiments.

For example, FIGS. 2A-C illustrates three examples of rest positions for logs, with the rest positions having different stability configurations. In the examples, the stability of these rest positions is based in part on the cross sections of the logs in a plane defined by a longitudinal axis of the logs and by a height axis (e.g., an axis perpendicular to the plane of the conveyor 14). In the first example 210 (FIG. 2A), the log in the illustrated example rest position has two sections (torquing sections 213 and 218) that may allow the log to torque, or rotate, in the cross-sectional plane relative to the current position. In various embodiments, the LPO 20 may be configured to identify these torquing sections 213 and 218 by identifying sections that lie between low points in on the log and the ends of the log. These sections may be pulled by gravity and/or destabilized by other sources of force (e.g., by overhead press rolls, downstream chippers, etc.) to provide a torquing action relative to the low point in the log, creating a relatively unstable configuration for the log.

In contrast, the log in the illustrated example rest position 220 (FIG. 2B) has its low points almost at the ends of the log, which provides for less possibility of torquing relative to its position, and therefore a relatively stable configuration. Finally, the log in the illustrated rest position 230 (FIG. 2C) has a single torquing section 235 at one end, but no torquing section at the other end. This configuration may thus provide sufficient stability during subsequent processing. In various embodiments, the LPO 20 may thus be configured to compare rest positions such as the ones illustrated in examples 210-230 and to determine preferred rest positions based on the configurations' comparative stability.

Figure 3:
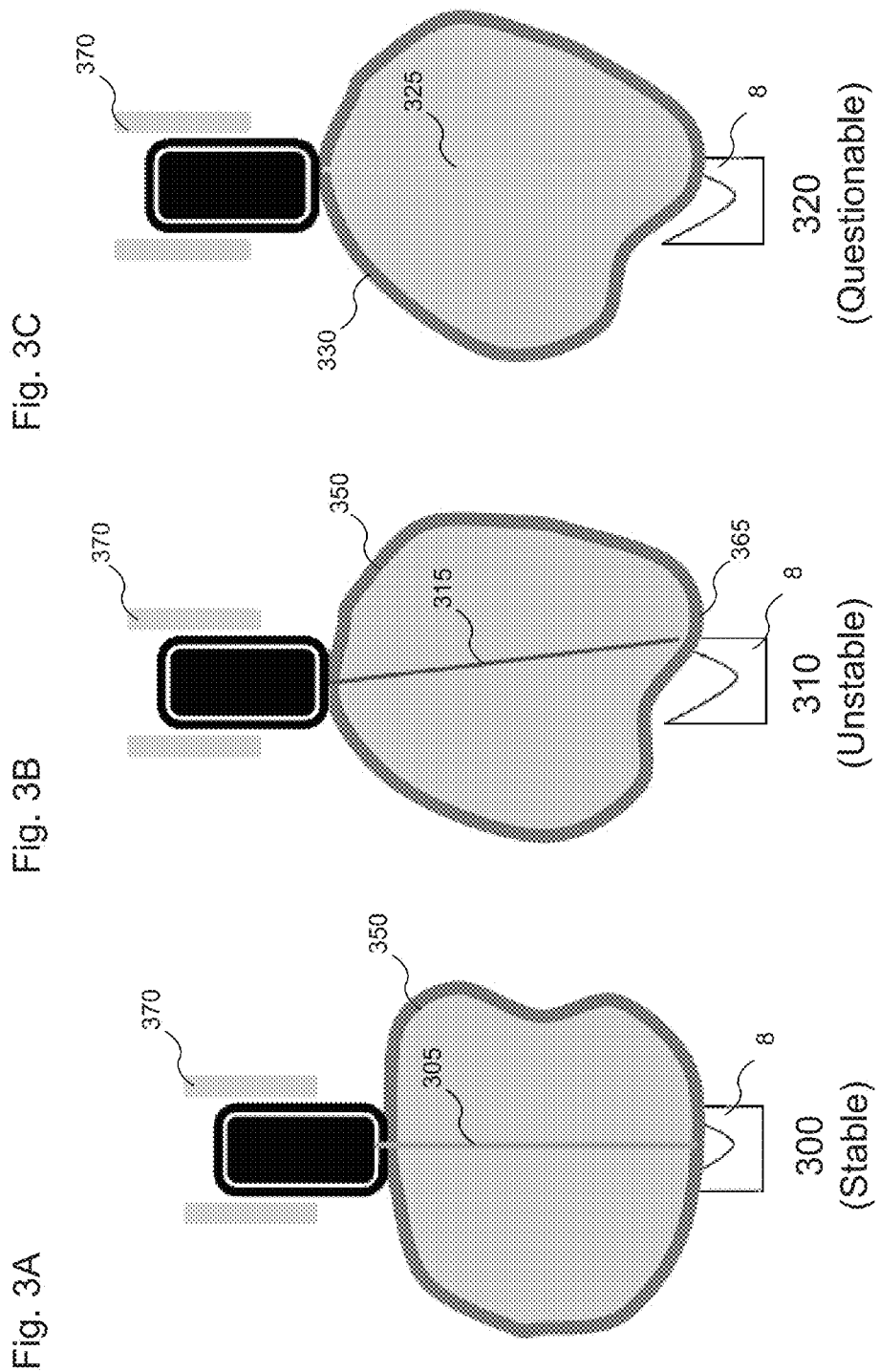
FIGS. 3A, 3B, and 3C are diagrams illustrating examples of stability configurations for logs in a second plane, in accordance with various embodiments.

FIGS. 3A-3C illustrate three examples of stability configurations of logs based on their cross sections perpendicular to the longitudinal plane. As the examples of FIGS. 3A-3C illustrate, a log 350 may exhibit different degrees of stability when impaled on the sharp chain 8 360 based on its orientation in this plane. In particular, as illustrated, the stability of the log 350 may be affected when the log 350 is struck from above, such as by a top press roll or overhead roll (370), in order to impale the log in the sharp chain 8. In some embodiments, the log may be made to attach to the sharp chain 8 by a log positioning mechanism 40, turning rolls 45, or by skids underneath the log.

Thus, in the example orientation of FIG. 3A, when the log 350 is impaled on the sharp chain 8, the force produced from the strike is relatively vertical (as illustrated by the line 305). This may produce a relatively stable impalement of the log 350 on the sharp chain 8. By contrast, when oriented as in FIG. 3B, the force produced by the strike, as illustrated by the line 315, has a larger horizontal component. This larger horizontal component may be due in part to the log containing a bottom extent 365 that falls outside of where the sharp chain 8 connects with the log. This may cause the log 350 to be unstable on the chain. As discussed below, in some embodiments, the LPO 20 may be configured to determine if, with a cross-sectional plane, the bottom extent of the log falls outside of where the sharp chain 8 will connect with the log.

Finally, in the example orientation of FIG. 3C, the log 350 may experience some force (illustrated by the line 325) that has some horizontal component, but which may not be so great that the log orientation is unstable. In various embodiments, the LPO 20 may be configured to take these impacts on stability into account when determining one or more preferred orientations and/or positions for the log.

Figure 4:
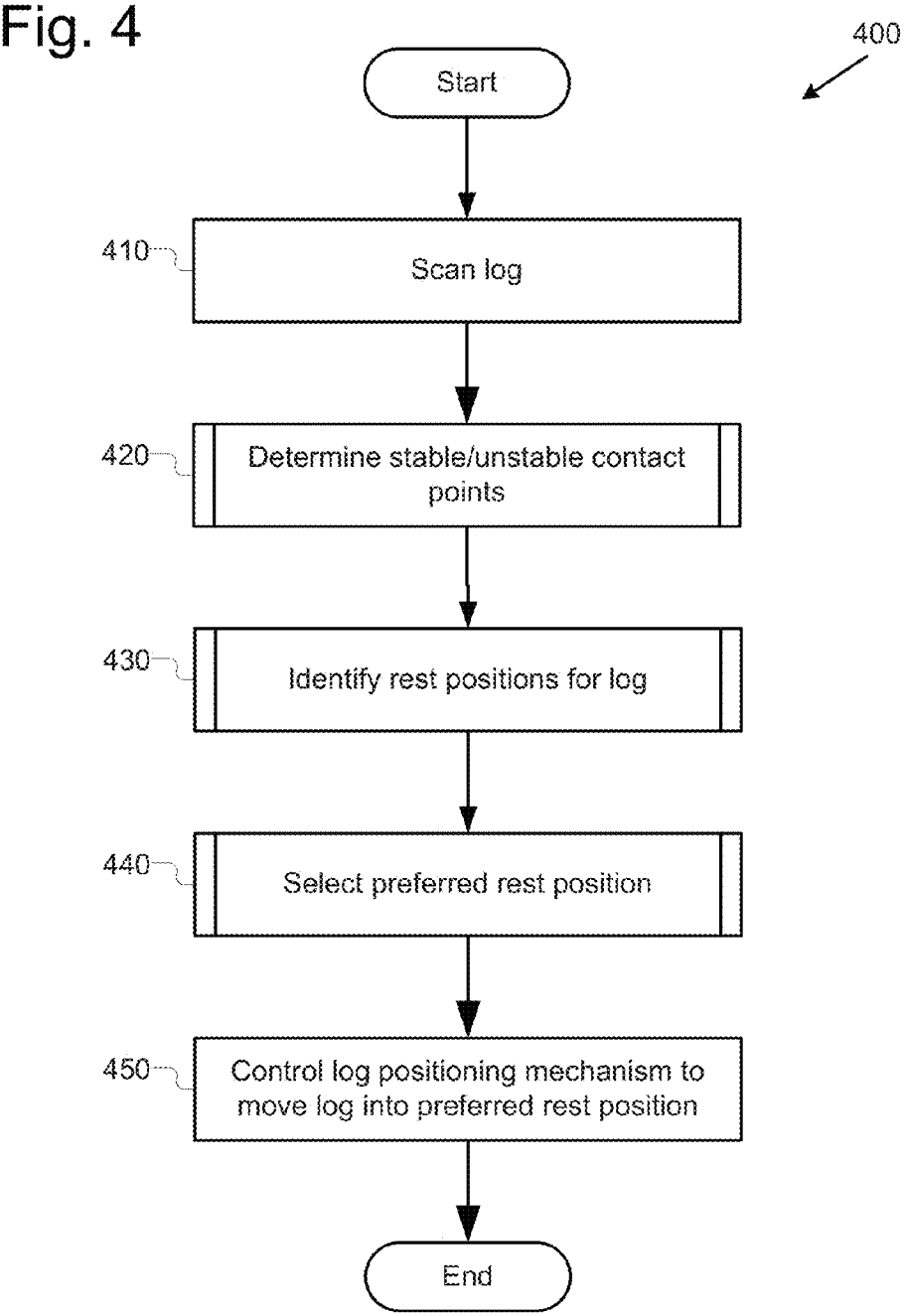
FIG. 4 illustrates an example log stability determination process of a log stability determination and positioning system, in accordance with various embodiments.

FIG. 4 illustrates an example log stability determination process 400 of the system 10, in accordance with various embodiments. It may be recognized that, while the operations of process 400 are arranged in a particular order and illustrated once each, in various embodiments one or more of the operations may be repeated, omitted, or performed out of order. The process may begin at operation 410 where the log is scanned, such as by the scanner 15, to determine geometrical information and/or surface characteristics for the log. Next, at operation 430 the LPO 20 may determine one or more stable and/or unstable contact points between the log and the sharp chain 8. Thus, in various embodiments the LPO 20 may determine, for various points at which the log and the sharp chain 8 may make contact, which of those points may be considered stable or unstable. Particular embodiments of operation 420 are described below with reference to process 500 of FIG. 5.

At operation 430 the LPO 20 may identify one or more rest positions for the log. Particular embodiments of operation 430 are described below with reference to process 1000 of FIG. 10. Next, at operation 440 the LPO 20 may select a preferred rest position from the rest positions identified at operation 430. Particular embodiments of operation 440 are described below with reference to process 1100 of FIG. 11. After selection of a preferred rest position, at operation 450 the LPO 20 may then control the log positioning mechanism 40 to position and/or orient the log into the preferred rest position. The process may then end.

Figure 5:
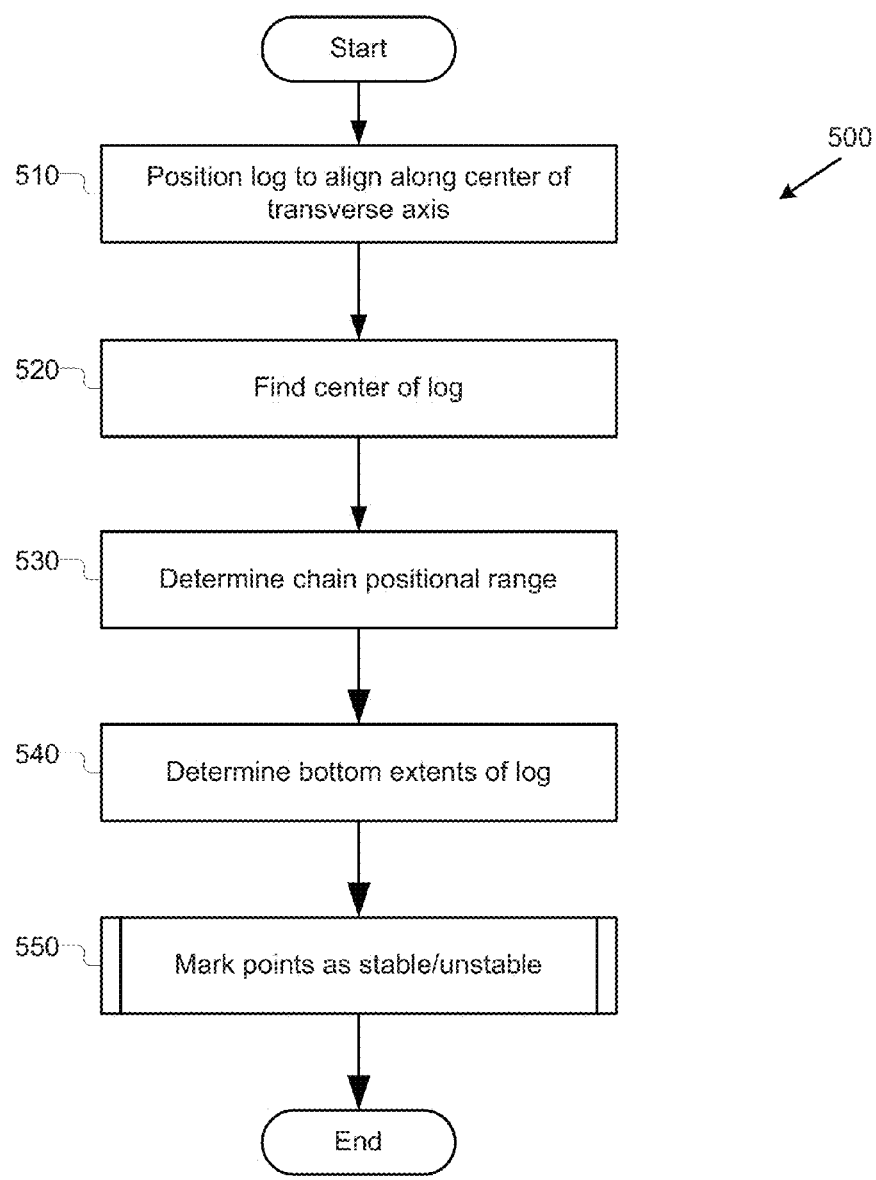
FIG. 5 illustrates an example contact point stability determination process, in accordance with various embodiments.

FIG. 5 illustrates an example contact point stability determination process, in accordance with various embodiments. In various embodiments process 500 may include one or more embodiments of operation 420 of process 400. It may be recognized that, while the operations of process 500 are arranged in a particular order and illustrated once each, in various embodiments, one or more of the operations may be repeated, omitted, or performed out of order. The process may begin at operation 510, where the LPO 20 may cause the log to be positioned to align the log with the sharp chain at the center of a transverse axis (e.g., a width axis perpendicular to both the longitudinal axis and the height axis). Next, at operation 520, the LPO 20 may find a center for the log. It is the line of this center that may be contacted by the thumper 370 to impale the log on the sharp chain 8. Therefore, the LPO 20 may take the position of the center relative to the sharp chain 8 into account before determining how stable the contact may be between the log and the sharp chain 8.

Next, at operation 530 the LPO 20 may determine a positional range for the chain relative to the log. In various embodiments, this positional range may depend in part on the type and/or capabilities of the log positioning mechanism 40. Thus, if the log positioning mechanism may move the log to a large extent along the width axis, the positional range may be larger; if not, the positional range may be smaller. Next, at operation 550 the LPO 20 may mark various contact points along the log as either stable or unstable. Particular embodiments of operation 550 are described below with reference to process 600 of FIG. 6.

Figure 6:
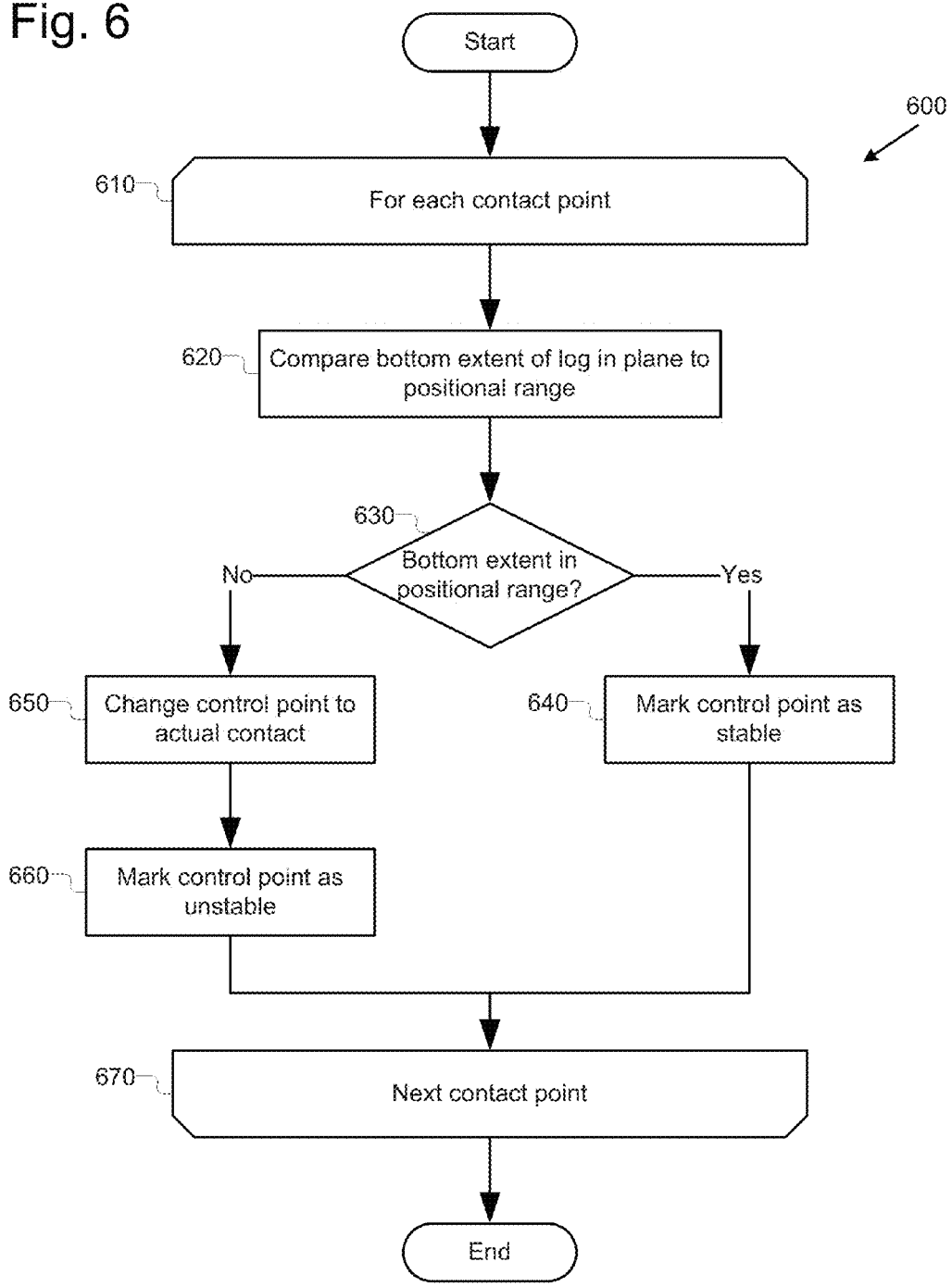
FIG. 6 illustrates an example contact point marking process, in accordance with various embodiments.

FIG. 6 illustrates an example contact point marking process 600, in accordance with various embodiments. In various embodiments, process 600 may include one or more embodiments of operation 550 of process 500. It may be recognized that, while the operations of process 600 are arranged in a particular order and illustrated once each, in various embodiments one or more of the operations may be repeated, omitted, or performed out of order. The process may begin at loop operation 610, where a loop may be begun for each contact point that may occur between the log and the sharp chain 8. Next, at operation 620 the LPO 20 may compare the previously-determined bottom extent of the log (in the cross sectional plane of the log perpendicular to the longitudinal axis) to the previously-determined positional range. At decision operation 630 the LPO 20 may determine if the contact point lies within the positional range for the sharp chain 8. If the bottom extent lies within the positional range, then at operation 640 the LPO 20 may mark the contact point as a stable point. If not, however, then at operation 650 the LPO 20 may note where actual contact will occur in the positional range, and alter the contact point accordingly. Then, at operation 660 the contact point is marked as unstable. In some embodiments, if the bottom extent of the log within the cross section is outside the positional range, a maximum impalement depth may be calculated based on the position at which the skid would interfere with impalement. This maximum depth position reflects that no matter how the log is positioned that the log cannot be impaled at this contact point. This contact point is flagged as unstable and as such cannot be used as one of the end contact points.

In either course, at loop operation 670 the loop may be repeated for a next contact point. When the loop is no longer repeated, the loop may end.

Figure 7:
FIGS. 7, 8, and 9 are diagrams illustrating example rest positions for a log, in accordance with various embodiments.
Figure 8:
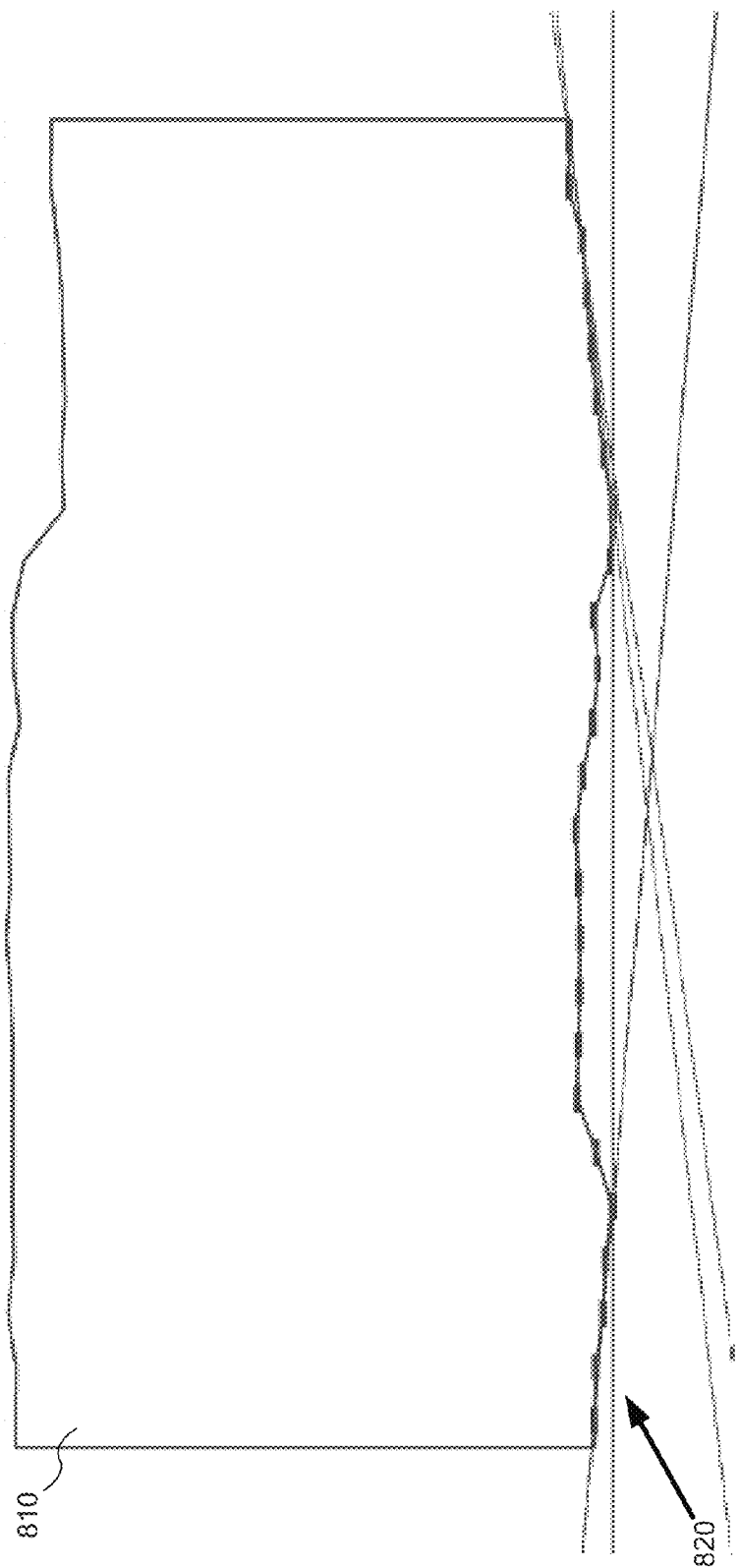
Figure 9:
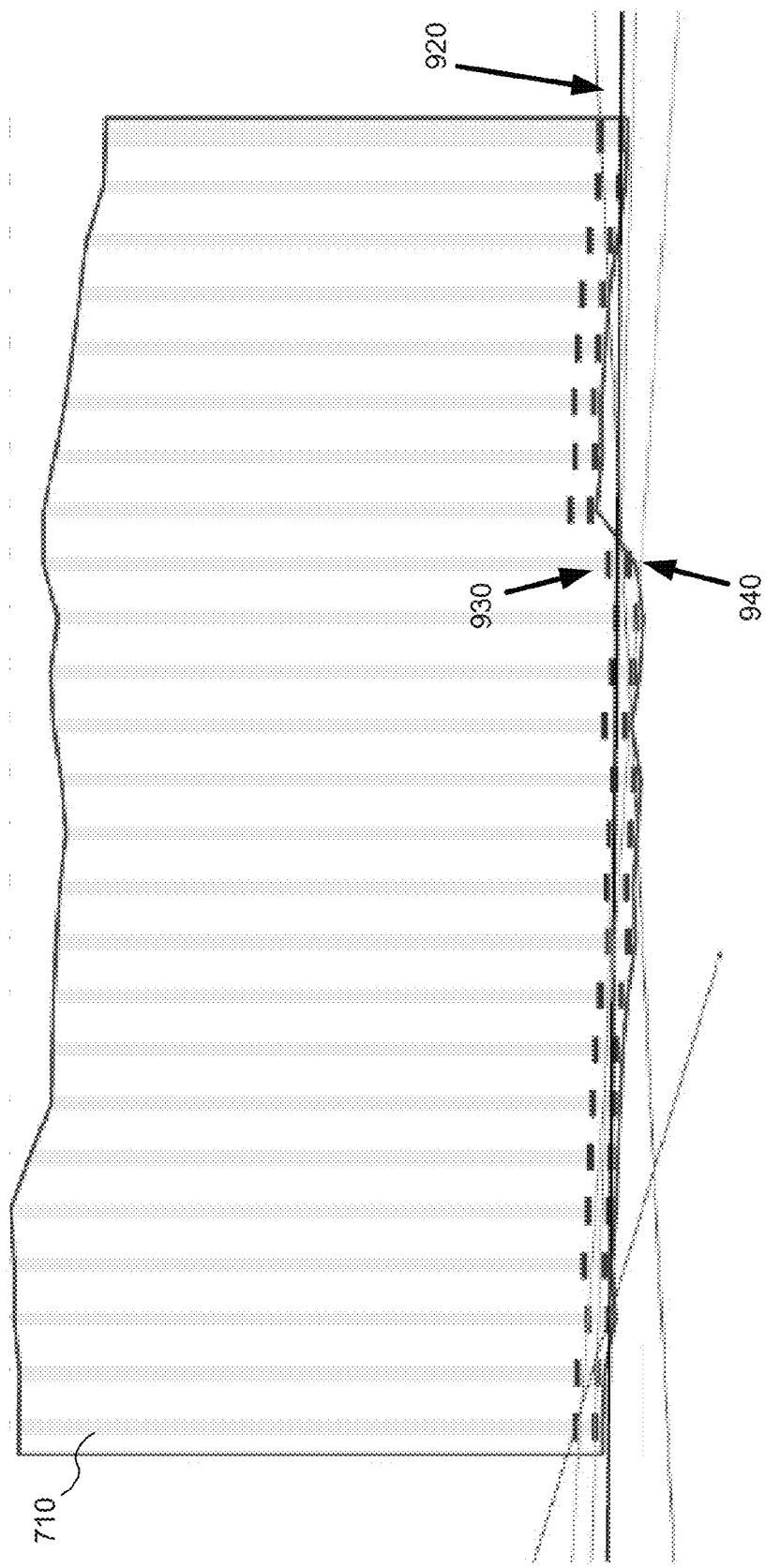

As discussed above, at operation 430 of process 400 the LPO 20 may identify one or more rest positions for the log. FIGS. 7-9 are diagrams illustrating example rest positions for a log, in accordance with various embodiments. As illustrated, in various embodiments a rest position for a log may be defined by two contact points. Thus, in various embodiments the LPO 20 may be configured to identify rest positions by considering contact point pairs, and determining the potential stability of the log when rested on those points on the sharp chain 8.

FIG. 7 illustrates an example cross section 710 for a log with 24 contact points 740. Additionally, FIG. 7 also illustrates various rest positions 750 using lines that connect two different contact points. As illustrated, for some rest positions, such as the one defined by the line 720, the log may experience a relatively large degree of torque. For example, in the rest position defined by line 720 there is a large torquing section 725 that exists between the first contact point through the line 720 and the left end of the log. In this case, the log is more likely to exhibit torquing while on the sharp chain 8, and the rest position defined by the line 720 may be considered by the LPO 20 to be unstable. In contrast, in the example cross section 810 of FIG. 8, in the rest position defined by line 820 there may be minimal torquing effect exhibited by the log, and the log may thus exhibit a relative degree of stability.

FIG. 9 illustrates examples of rest position stability when impalement depth on the sharp chain 8 is considered. The illustrated examples of FIG. 9 are based on the same example cross section 710 that was illustrated in FIG. 7. In various embodiments a sharp chain 8 may be configured to impale a log between a minimum and maximum depth. Thus, as illustrated, at each contact point there may be maximum and minimum depths, illustrated by example markings 930 and 940, respectively. In various embodiments a rest position may be considered to be stable based on how the line between its associated contact points lies within these maximum and minimum depths. For example, as FIG. 9 illustrates, for the rest position defined by line 920, the line lies at or below the maximum depth for every contact point on the log. This may mean there are no points that would prevent stable contact between the log and the sharp chain 8, and the rest position may thus be considered to be stable. As such, when impalement depth is considered, a rest position may be determined that may be stable compared to a more naïve rest position determination that does not include impalement depth. In various embodiments the LPO 20 may be configured to determine stability for a rest position based on knowledge of these maximum and minimum depths. In particular, in various embodiments the LPO 20 may consider a rest position defined by two contact points as stable if there is no contact point in between whose maximum depth is outside of the line between the two contact points.

Figure 10:
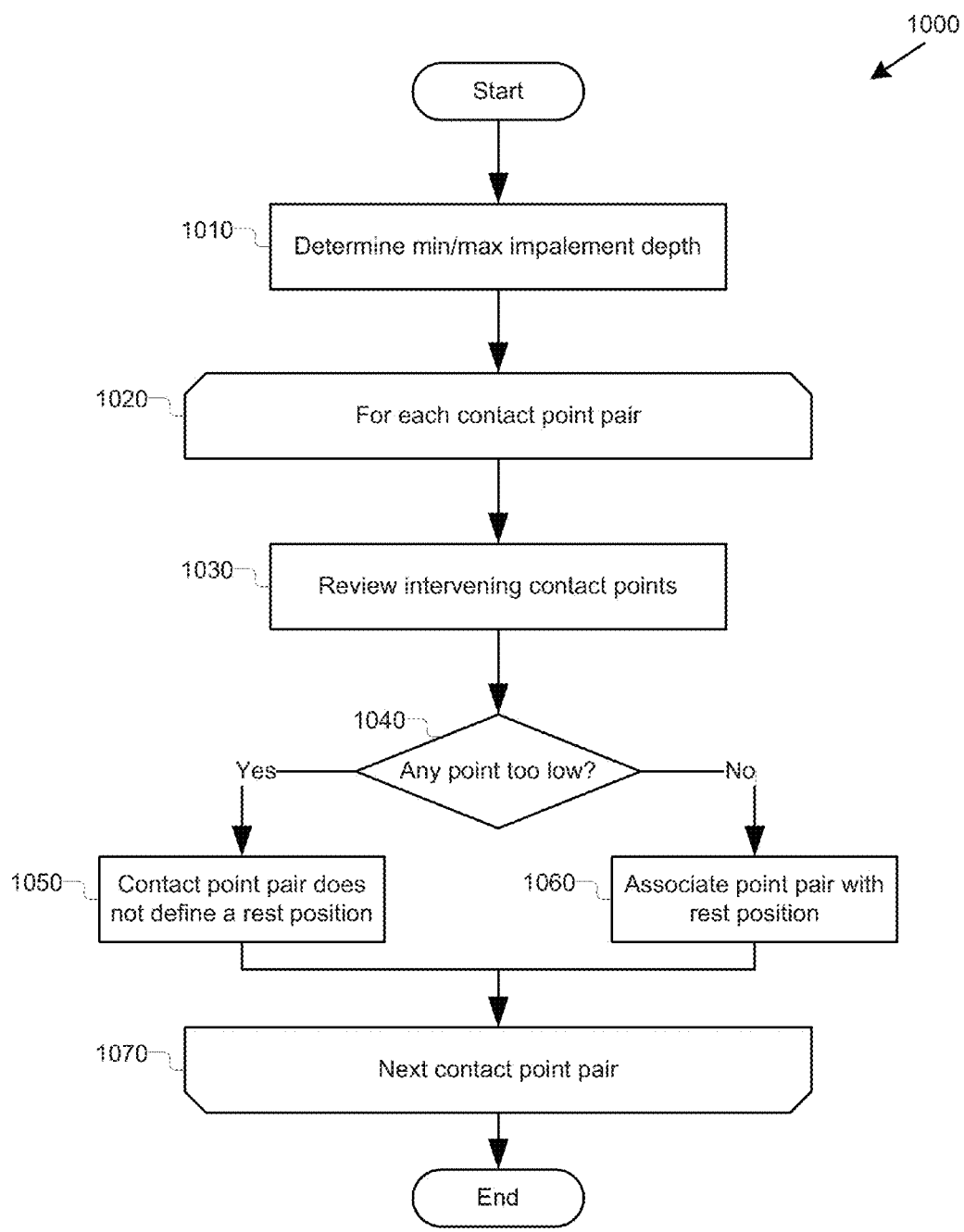
FIG. 10 illustrates an example rest position determination process, in accordance with various embodiments.

FIG. 10 illustrates an example rest position determination process 1000 in accordance with various embodiments. In various embodiments, process 1000 may include one or more embodiments of operation 430 of process 400. It may be recognized that, while the operations of process 1000 are arranged in a particular order and illustrated once each, in various embodiments one or more of the operations may be repeated, omitted, or performed out of order. The process may begin at operation 1010, where the LPO 20 may determine minimum and maximum impalement depths for the log on the sharp chain 8. In various embodiments, these depths may be based on various parameters, including but not limited, to log type, type of chain, and/or preferences of a user of the system 10.

Next, at loop operation 1020 the LPO 20 may begin a loop for each of multiple contact point pairs, to test for the rest position defined by each of these pairs. At operation 1030, the LPO 20 may review one or more intervening contact points between the pair of contact points. At decision operation 1040 the LPO 20 may determine whether any of the intervening points is too low for the rest position to be stable. In various embodiments, the LPO 20 may determine whether an intervening contact point is too low by determining whether the line defined by the contact points for the rest position stays outside of the maximum impalement depth for every intervening point.

If there are any intervening points that are too low, then at operation 1050 the LPO 20 may determine that the contact point pair does not define a rest position. If, however, there are no intervening points that are too low, then at operation 1060 the LPO may associate the contact point pair as a rest position for the log. In either event, at loop operation 1070 the LPO 20 may continue the loop for a next contact point pair. When the loop ends, the process may end.

Figure 11:
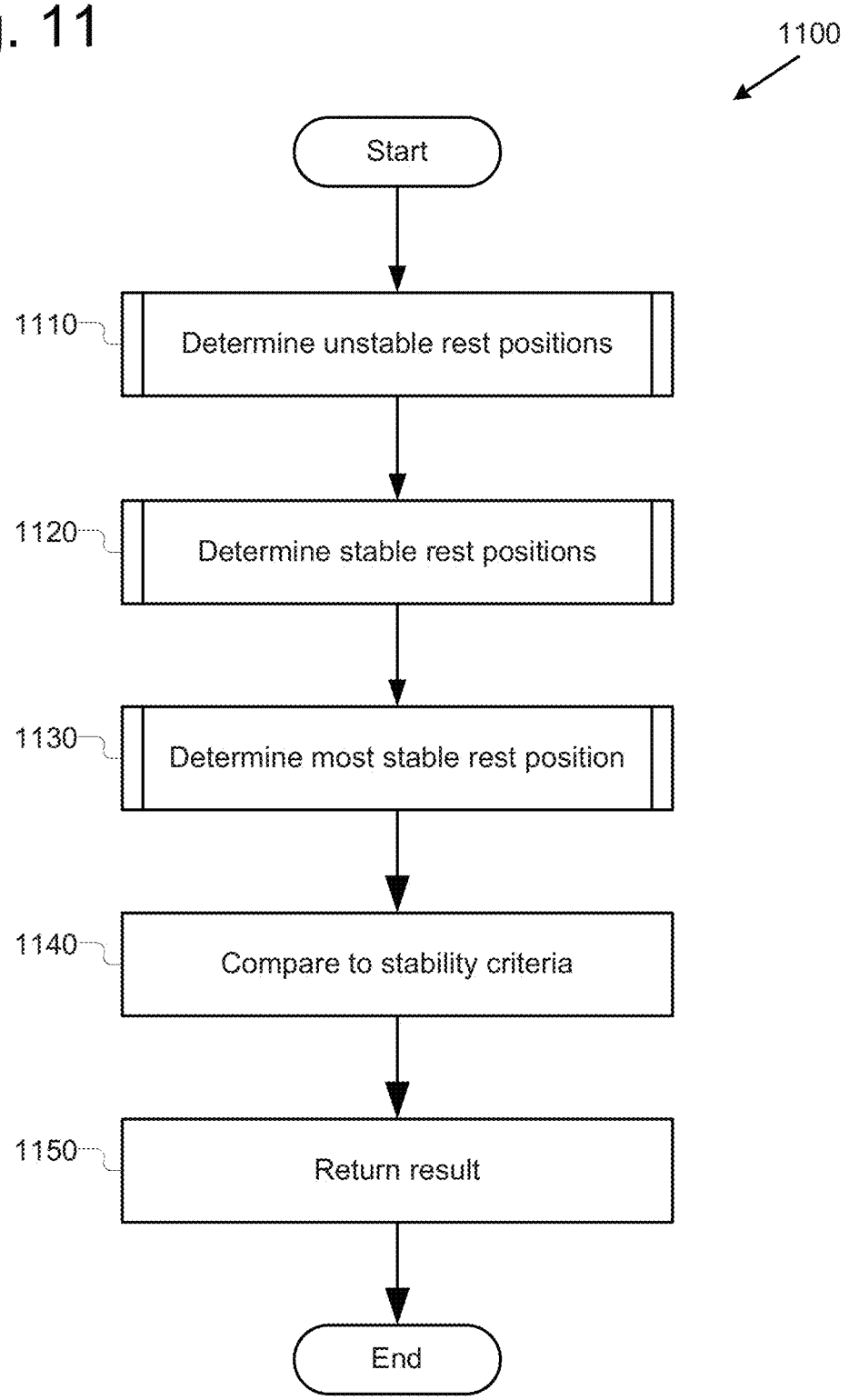
FIG. 11 illustrates an example preferred rest position selection process, in accordance with various embodiments.

FIG. 11 illustrates an example preferred rest position selection process 1100 in accordance with various embodiments. In various embodiments, process 1100 may include one or more embodiments of operation 440 of process 400 for the LPO 20 to select a preferred rest position out of those identified during process 1000. It may be recognized that, while the operations of process 1100 are arranged in a particular order and illustrated once each, in various embodiments one or more of the operations may be repeated, omitted, or performed out of order. The process may begin at operation 1110, where the LPO 20 may determine one or more unstable rest positions out of the previously-identified rest positions. Particular embodiments of operation 1110 are described below with reference to process 1200 of FIG. 12. Next, at operation 1120, the LPO 20 may determine stable rest positions out of the rest positions not previously determined to be unstable. Particular embodiments of operation 1120 are described below with reference to process 1300 of FIG. 13.

Next, at operation 1130 the LPO 20 may determine a most stable rest position out of the rest positions determined to be stable. In various embodiments, rather than determine the most stable rest position, other criteria may be considered instead of or in addition to a determination of the most stable rest position. For example, other criteria for the LPO 20 to consider include, but are not limited to: ease of cutting, prediction of waste, prediction of boards to be produced from the log in the rest position, etc. Next, at operation 1140 the LPO may compare the determined most stable rest position to other stability criteria. Then, at operation 1150 the result of this determination may be returned, such as for use in controlling the log positioning mechanism 40. The process may then end.

Figure 12:
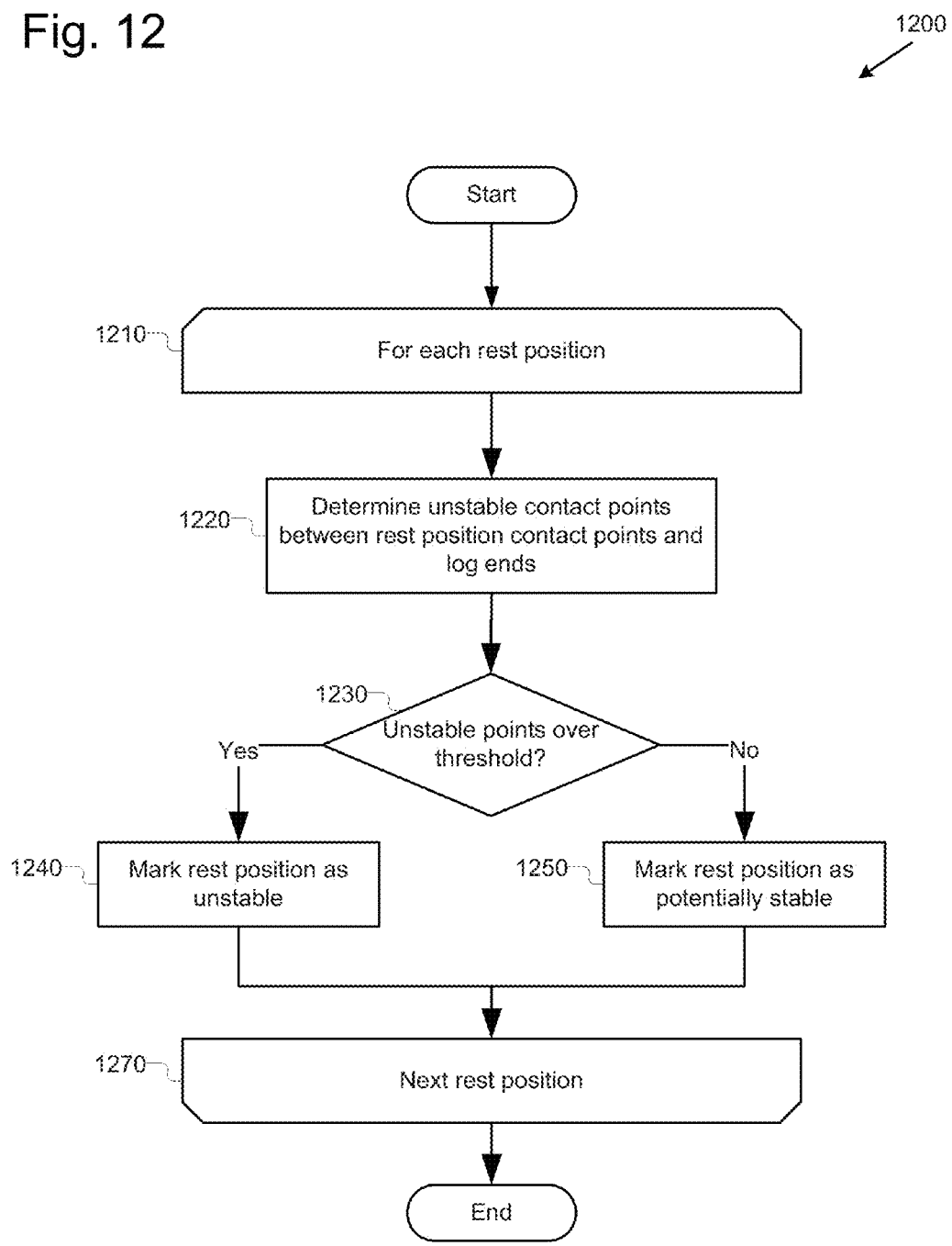
FIG. 12 illustrates an example unstable rest position determination process, in accordance with various embodiments.

FIG. 12 illustrates an example unstable rest position determination process in accordance with various embodiments. In various embodiments process 1200 may include one or more embodiments of operation 1110 of process 1100. It may be recognized that, while the operations of process 1200 are arranged in a particular order and illustrated once each, in various embodiments, one or more of the operations may be repeated, omitted, or performed out of order. The process may begin at loop operation 1210, where the LPO 20 may begin a loop for each identified rest position. At operation 1220, the LPO 20 may determine if there are any unstable contact points between the contact points associated with the rest position and the ends of the log. Next, at decision operation 1230 the LPO 20 may determine if the number of unstable contact points is above a pre-set threshold. In various embodiments this threshold may be set by a user of the system 10, or through other means. If the number of unstable contact points is above the threshold, then at operation 1240 the LPO 20 may mark the rest position as unstable.

If, instead, the number of points is not above the threshold, then at operation 1250 the LPO 20 may mark the position as potentially stable. Then, at loop operation 1270 the LPO may repeat the loop for the next previously-identified rest position. Once the loop is no longer repeated, the process may end.

Figure 13:
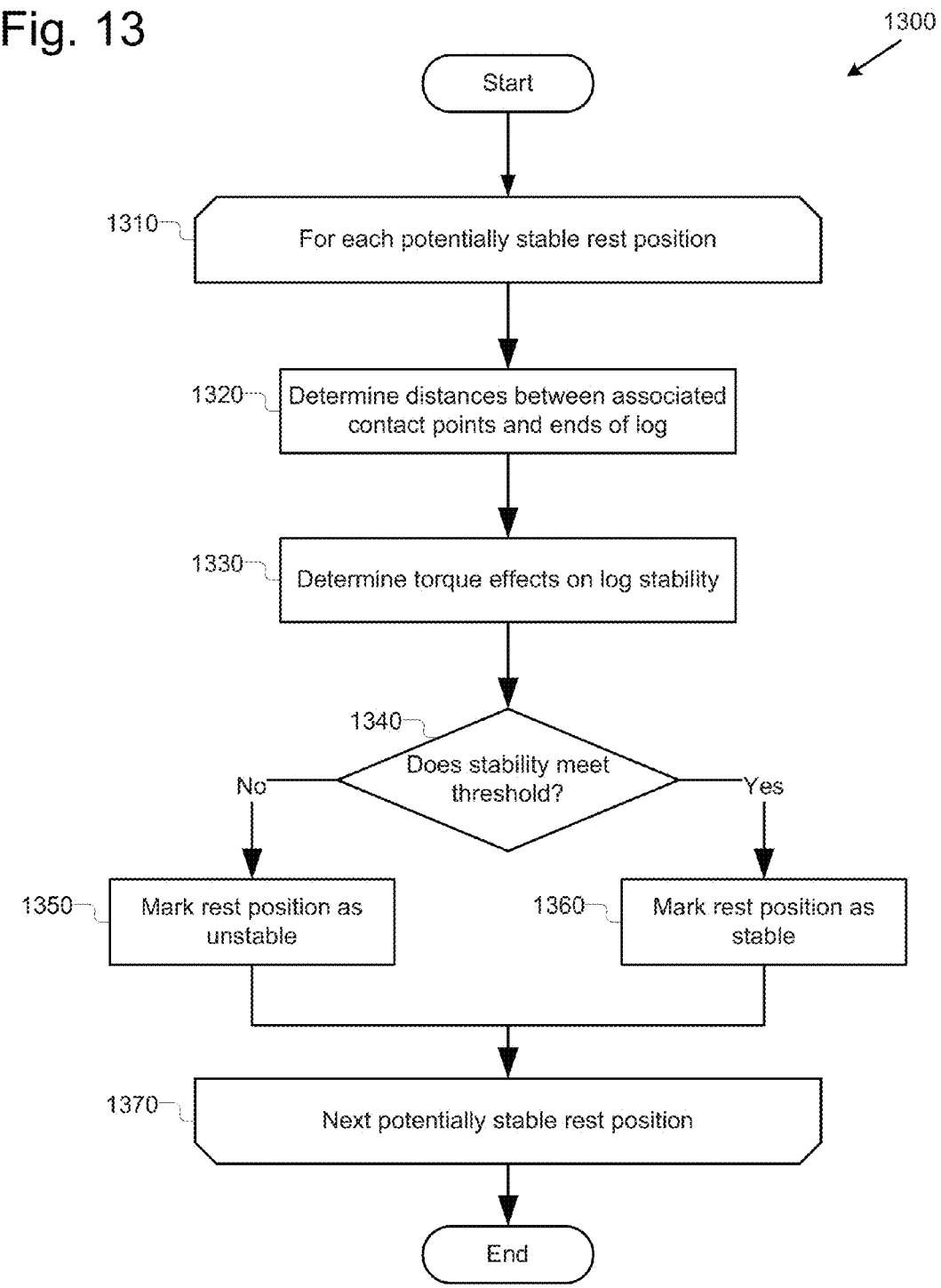
FIG. 13 illustrates an example stable rest position determination process, in accordance with various embodiments.

FIG. 13 illustrates an example stable rest position determination process 1300, in accordance with various embodiments. In various embodiments, process 1300 may include one or more embodiments of operation 1120 of process 1100. It may be recognized that, while the operations of process 1300 are arranged in a particular order and illustrated once each, in various embodiments one or more of the operations may be repeated, omitted, or performed out of order. The process may begin at loop operation 1310, where a loop may begin for each potentially stable rest position. At operation 1320, the LPO 20 may determine distances between the two contact points associated with the rest position and each of the ends of the log. Next, at operation 1330 the LPO 20 may determine torque effects on log stability based at least in part on the distances determined at operation 1320. For example, in some embodiments the length of the distance may be considered to be substantially directly proportional to the amount of torque experienced at each end. In other embodiments, the thickness and/or density of the log in these torquing sections may be considered in addition to the potentially torquing distances.

Next, at decision operation 1330 the LPO 20 may determine if the stability meets a particular threshold. In various embodiments, the stability determination may be based at least in part on a net torque experienced across the two ends of the log. In other embodiments, the stability determination may be determined according to a total torque experienced on both ends. In yet other embodiments, other stability determinations may be considered. If the stability does not meet the threshold, then at operation 1350 the rest position may be marked as unstable. If the stability does meet the threshold, then at operation 1360 the rest position may be marked as stable. Next, at loop operation 1370 the loop may be repeated for a next potentially stable rest position. Once the loop ceases repeating, the process may end.

Figure 14:
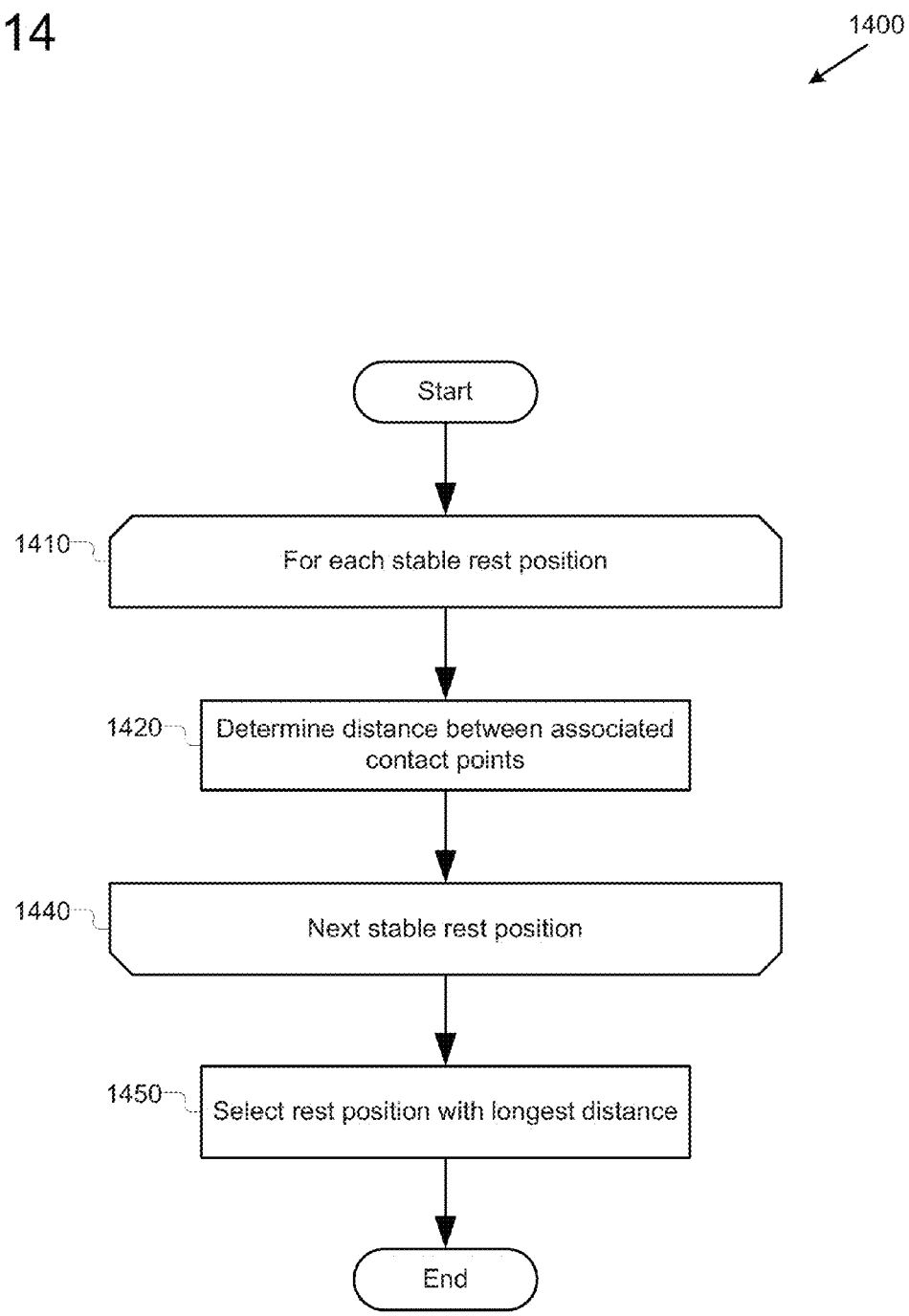
FIG. 14 illustrates an example preferred rest position selection process, in accordance with various embodiments.

FIG. 14 illustrates an example most stable rest position selection process in accordance with various embodiments. In various embodiments, process 1400 may include one or more embodiments of operation 1130 of process 1100. It may be recognized that, while the operations of process 1400 are arranged in a particular order and illustrated once each, in various embodiments one or more of the operations may be repeated, omitted, or performed out of order. The process may begin at loop operation 1410, where the LPO 20 may begin a loop for each stable rest position. Next, at operation 1420 the LPO 20 may determine the distance between the two contact points for the rest position. Then, at loop operation 1440 the LPO 20 may continue the loop for the next stable rest position. Once the loop has stopped repeating, at operation 1450 the LPO 20 may select the rest position with the longest distance as the preferred rest position. In various embodiments, rather than determine the preferred rest position based solely on the distance between the two contact points, the LPO 20 may based the selection on other factors, such as, for example, placement of the section between the two contact points on the log. In other embodiments, if no stable rest position was previously identified, then process 1400 may still be performed to determine a rest position that is most stable out of the unstable rest positions, and to select the rest position as the preferred rest position. The process may then end.

Figure 15:
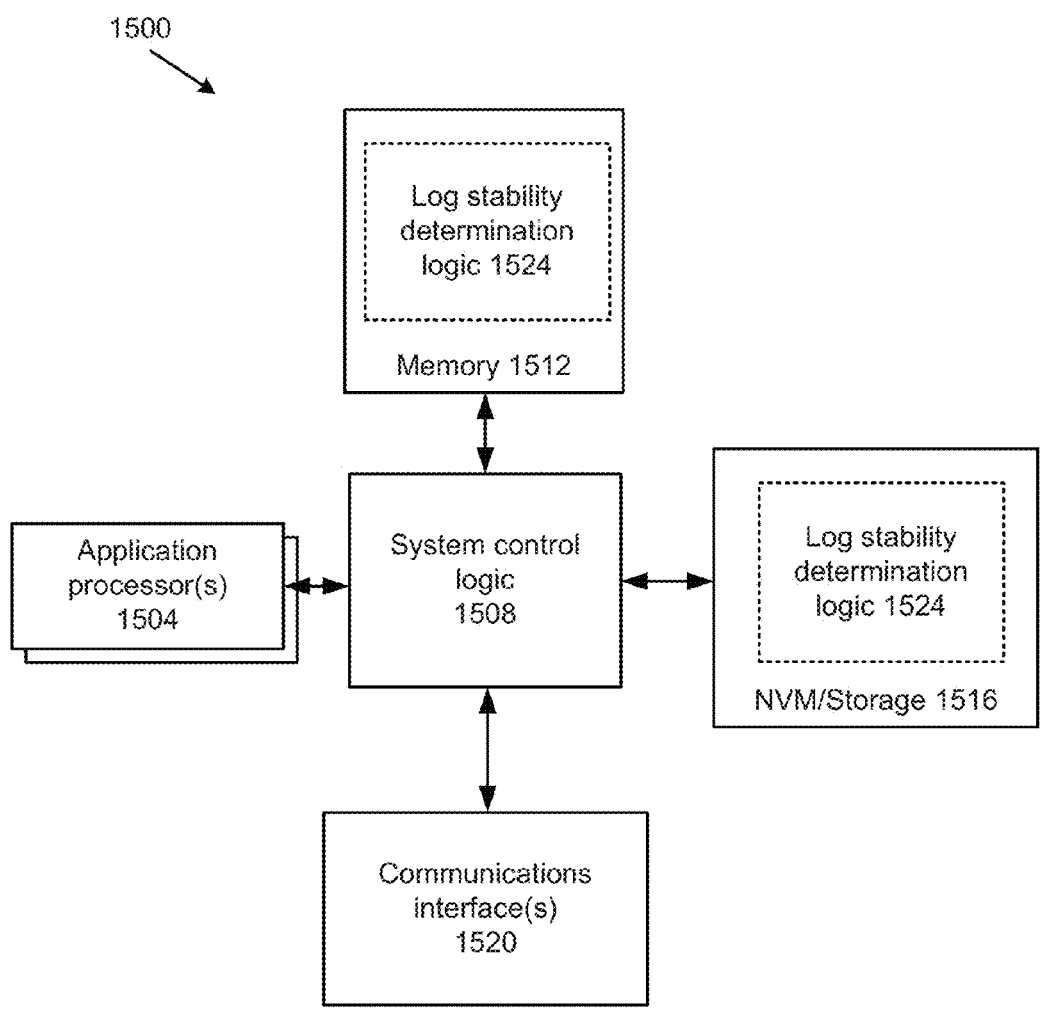
FIG. 15 illustrates an example computing environment suitable for practicing the disclosed embodiments, in accordance with various embodiments.

FIG. 15 illustrates, for one embodiment, an example computing device 1500 suitable for practicing embodiments of the present disclosure. As illustrated, example computing device 1500 may include control logic 1508 coupled to at least one of the processor(s) 1504, system memory 1512 coupled to system control logic 1508, non-volatile memory (NVM)/storage 1516 coupled to system control logic 1508, and one or more communications interface(s) 1520 coupled to system control logic 1508. In various embodiments the one or more processors 1504 may be a processor core.

System control logic 1508 for one embodiment may include any suitable interface controller(s) to provide for any suitable interface to at least one of the processor(s) 1504 and/or to any suitable device or component in communication with system control logic 1508. System control logic 1508 may also interoperate with a display 1506 for display of information, such as to a user. In various embodiments the display may include one of various display formats and forms, such as, for example, liquid-crystal displays, cathode-ray tube displays, and e-ink displays. In various embodiments the display may include a touch screen.

System control logic 1508 for one embodiment may include one or more memory controller(s) to provide an interface to system memory 1512. System memory 1512 may be used to load and store data and/or instructions, for example, for system 1500. In one embodiment system memory 1512 may include any suitable volatile memory, such as suitable dynamic random access memory ("DRAM").

System control logic 1508, in one embodiment, may include one or more input/output ("I/O") controller(s) to provide an interface to NVM/storage 1516 and communications interface(s) 1520.

NVM/storage 1516 may be used to store data and/or instructions, for example. NVM/storage 1516 may include any suitable non-volatile memory, such as flash memory, for example, and/or may include any suitable non-volatile storage device(s), such as one or more hard disk drive(s) ("HDD (s)"), one or more solid-state drive(s), one or more compact disc ("CD") drive(s), and/or one or more digital versatile disc ("DVD") drive(s), for example.

The NVM/storage 1516 may include a storage resource that may physically be a part of a device on which the system 1500 is installed, or it may be accessible by, but not necessarily a part of, the device. For example, the NVM/storage 1516 may be accessed over a network via the communications interface(s) 1520.

System memory 1512, NVM/storage 1516, and system control logic 1508 may include, in particular, temporal and persistent copies of log stability determination logic 1524. The log stability determination logic 1524 may include instructions that when executed by at least one of the processor(s) 1504 result in the system 1500 practicing one or more aspects of the log stability determination techniques described above. Communications interface(s) 1520 may provide an interface for system 1500 to communicate over one or more network(s) and/or with any other suitable device. Communications interface(s) 1520 may include any suitable hardware and/or firmware, such as a network adapter, one or more antennas, a wireless interface, and so forth. In various embodiments, communication interface(s) 1520 may include an interface for system 1500 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 1504, memory 1512, and so forth may vary. In various embodiments, computing device 1500 may be, but not limited to, a smartphone, a computing tablet, a ultrabook, an e-reader, a laptop computer, a desktop computer, a set-top box, a game console, or a server. In various embodiments computing device 1500 may be, but not limited to, one or more servers known in the art.

For one embodiment, at least one of the processor(s) 1504 may be packaged together with system control logic 1508 and/or log stability determination logic 1524. For one embodiment, at least one of the processor(s) 1504 may be packaged together with system control logic 1508 and/or log stability determination logic 1524 to form a System in Package ("SiP"). For one embodiment, at least one of the processor(s) 1504 may be integrated on the same die with system control logic 1508 and/or log stability determination logic 1524. For one embodiment, at least one of the processor(s) 1504 may be integrated on the same die with system control logic 1508 and/or log stability determination logic 1524 to form a System on Chip ("SoC").

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A log rotation system comprising:
a conveyor configured to convey a log in a first direction, wherein the conveyor comprises a sharp chain configured to impale the log at one or more points along a substantially longitudinal axis of the log and to convey the log in the first direction along the longitudinal axis;
one or more log positioning mechanisms configured to controllably rotate and/or position the log for placement of the log onto the conveyor; and
a log position optimizer configured to
identify, based on a scan of the log, one or more rest positions for the log on the conveyor, wherein the log position optimizer is configured to identify a rest position for the log through identification of first and second contact points on the log where the sharp chain can impale the log that are associated with the rest position,
select a preferred rest position from among the one or more rest positions for the log, based at least in part on one or more determinations of stability of the one or more rest positions, and
control the one or more log positioning mechanisms to position the log in the preferred rest position on the conveyor.

2. The system of claim 1, wherein the log position optimizer is further configured to identify a rest position only for associated contact points that have no intervening contact points that prevent stable contact between the sharp chain and the associated contact points.

3. The system of claim 2, wherein:
the sharp chain is configured to impale the log at contact points at depths between predetermined maximum and minimum depths; and
the log position optimizer is configured to determine that an intervening contact point prevents stable contact between the sharp chain and the associated contact points if impalement at the associated contact points would include impalement at the intervening contact point exceeding the maximum depth.

4. The system of claim 1, wherein select a preferred rest position comprises identification of one or more stable rest positions out of the rest positions.

5. The system of claim 4, wherein identification of one or more stable rest positions comprises, for respective rest positions, performance of:
determination of distances between the rest position's associated contact points and ends of the log along the longitudinal axis; and
identification of the rest position as stable if the determined distances are below predetermined thresholds.

6. The system of claim 4, wherein:
select a preferred rest position further comprises determination of one or more unstable rest positions out of the one or more rest positions; and
identification of one or more stable rest positions comprises identification of one or more stable rest positions out of one or more rest positions not determined to be unstable.

7. The system of claim 6, wherein determination of one or more unstable rest positions comprises: for respective rest positions,
identification of contact points that are unstable in a plane perpendicular to the longitudinal axis of the log and which lie between the contact points associated with the rest position and the ends of the log; and
determination of whether a number of unstable contact points is greater than a predetermined threshold.

8. The system of claim 7, wherein identification of a contact point that is unstable in the plane comprises determination of whether a bottom-most point of the log in the plane is below the contact point.

9. The system of claim 8, wherein:
the chain has a potential positional range;
the contact point may fall at any point in the plane within the positional range; and
determination of whether a bottom-most point of the log in the plane is below the contact point comprises determination of whether the bottom-most point of the log in the plane is outside of the positional range.

10. The system of claim 4, wherein select a preferred rest position further comprises selection of a stable rest position that has a greatest distance between its two associated contact points out of the stable rest positions.

11. The system of claim 10, wherein select a preferred rest position further comprises, if no rest positions are identified as stable, selection of a rest position out of unstable rest positions that has a greatest distance between its two associated contact points.

12. A method of positioning a log on a sharp chain configured to impale the log at one or more points along a substantially longitudinal axis of the log and to convey the log in a first direction along the longitudinal axis, the method comprising:
scanning, by a scanning device, the log to determine shape and position data for the log;
identifying, by one or more computing devices, one or more rest positions for the log on the sharp chain, wherein identifying a rest position of the log comprises identifying first and second contact points on the log where the sharp chain can impale the log that are associated with the rest position and for which there is no intervening third contact point that prevents stable contact between the sharp chain and the first and second contact points; and
selecting, by the one or more computing devices, a preferred rest position from among the one or more rest positions based at least in part on one or more determinations of stability of the one or more rest positions.

13. The method of claim 12, wherein the method further comprises controlling, by the one or more computing devices, one or more log positioning mechanisms disposed around the sharp chain to position the log into the preferred position on the sharp chain.

14. The method of claim 12, wherein:
the sharp chain is configured to impale the log at contact points at depths between predetermined maximum and minimum depths; and
the method further comprises determining that an intervening contact point prevents stable contact between the sharp chain and the associated contact points if impalement at the associated contact points would cause impalement at the intervening contact point to exceed the maximum depth.

15. The method of claim 12, wherein selecting a preferred rest position comprises:
determining distances between the rest position's associated contact points and ends of the log along the longitudinal axis; and
identifying the rest position as stable if the determined distances are below predetermined thresholds.

16. The method of claim 15, wherein selecting a preferred rest position further comprises:

identifying contact points that are unstable in a plane perpendicular to the longitudinal axis of the log and that lie between the contact points associated with the rest position and the end of the log;

determining a rest position to be unstable if a number of unstable contact points is greater than a predetermined threshold; and identifying one or more stable rest positions out of one or more rest positions not determined to be unstable.

17. The method of claim 16, wherein identifying a contact point that is unstable in the plane comprises determining whether a bottom-most point of the log in the plane is below the contact point.

18. The method of claim 17, wherein:

the chain has a potential positional range;

the contact point may fall at any point in the plane within the positional range; and determination of whether a bottom-most point of the log in the plane is below the contact point comprises determining whether the bottom-most point of the log in the plane is outside of the positional range.

19. The method of claim 15, wherein selecting a preferred rest position further comprises selecting a stable rest position that has a greatest distance between its two associated contact points out of the stable rest positions.

20. The method of claim 19, wherein selecting a preferred rest position further comprises, if no rest positions are identified as stable, selecting a rest position out of unstable rest positions that has a greatest distance between its two associated contact points.

21. One or more non-transitory computer-readable media comprising instructions stored thereon that are configured to cause a computing device, in response to execution of the instructions by the computing device, to:

determine a shape and position of a log based at least on a scan of the log;

identify one or more rest positions for the log on a sharp chain, the sharp chain configured to impale the log at one or more points along a substantially longitudinal axis of the log and to convey the log in a first direction along the longitudinal axis, wherein identify a rest position for the log comprises identify first and second contact points on the log where the sharp chain can impale the log that are associated with the rest position and for which there is no intervening third contact point that prevents stable contact between the sharp chain and the first and second contact points; and select a preferred rest position from among the one or more rest positions based at least in part on one or more determinations of stability of the rest positions.

22. The one or more computer-readable media of claim 21, wherein the instructions are further configured to control one or more log positioning mechanisms disposed around the sharp chain to position the log into the preferred position on the sharp chain.

23. The one or more computer-readable media of claim 21, wherein:

the sharp chain is configured to impale the log at contact points at depths between predetermined maximum and minimum depths; and the instructions are further configured to cause the computing device to determine that an intervening contact point prevents stable contact between the sharp chain and the associated contact points if impalement at the associated contact points would cause impalement at the intervening contact point to exceed the maximum depth.

24. The one or more computer-readable media of claim 21, wherein select a preferred rest position comprises:

determine distances between the rest position's associated contact points and ends of the log along the longitudinal axis; and identify the rest position as stable if the determined distances are below predetermined thresholds.

25. The one or more computer-readable media of claim 24, wherein select a preferred rest position further comprises:

identify contact points that are unstable in a plane perpendicular to the longitudinal axis of the log and that lie between the contact points associated with the rest position and the end of the log that;

determine a rest position to be unstable if a number of unstable contact points is greater than a predetermined threshold; and identify one or more stable rest positions out of one or more rest positions not determined to be unstable.

26. The one or more computer-readable media of claim 25, wherein identify a contact point that is unstable in the plane comprises determine whether a bottom-most point of the log in the plane is below the contact point.

* * * * *